US010568271B2

(12) United States Patent
Neitemeier et al.

(10) Patent No.: US 10,568,271 B2
(45) Date of Patent: Feb. 25, 2020

(54) DETECTION ARRANGEMENT FOR DETECTING A STATE OF WEAR OF A CHOPPING ASSEMBLY

(71) Applicant: CLAAS SELBSFAHRENDE ERNTEMASCHINEN GMBH, Harsewinkel (DE)

(72) Inventors: Dennis Neitemeier, Lippetal (DE); Jochen Huster, Guetersloh (DE); Boris Kettelhoit, Guetersloh (DE); Frederic Fischer, Arnsberg (DE); Carsten Grove, Beelen (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 137 days.

(21) Appl. No.: 15/896,485

(22) Filed: Feb. 14, 2018

(65) Prior Publication Data

US 2018/0235154 A1    Aug. 23, 2018

(30) Foreign Application Priority Data

Feb. 21, 2017    (DE) .................. 10 2017 103 537

(51) Int. Cl.
*A01F 29/22*    (2006.01)
*A01F 29/09*    (2010.01)
(Continued)

(52) U.S. Cl.
CPC ............ *A01F 29/095* (2013.01); *A01F 15/08* (2013.01); *A01F 29/22* (2013.01); *G01B 7/14* (2013.01); *G01B 7/293* (2013.01)

(58) Field of Classification Search
CPC ......... A01D 43/08; A01F 12/40; A01F 15/08; A01F 29/095; A01F 29/22; A01F 29/16;
(Continued)

(56) References Cited

U.S. PATENT DOCUMENTS 4,198,006 A * 4/1980 Rolfe .................... A01F 29/095
                                                        241/222
5,018,342 A * 5/1991 McClure ................. A01F 29/09
                                                        241/101.71
(Continued)

FOREIGN PATENT DOCUMENTS

DE        102011005317 A1    9/2012
DE      10 2014 218 408      4/2015
EP            0943888 A2      9/1999

OTHER PUBLICATIONS

European Search Report dated Jun. 29, 2018.

*Primary Examiner* — Robert E Pezzuto
(74) *Attorney, Agent, or Firm* — Collard & Roe, P.C.

(57) ABSTRACT

A detection arrangement for detecting a state of wear of a chopping assembly comprises at least one magnet arrangement which includes a magnetic excitation arrangement and a flux-conducting device magnetically coupled thereto. The magnet arrangement provides a pole arrangement which forms at least one magnetic pole for outwardly conducting magnetic flux. At least one portion of the chopping blades moves past the pole arrangement during a rotation of the cutting cylinder, and forms an air gap arrangement including at least one air gap with respect to the pole arrangement and, as a result, at least one magnetic circuit excited by the excitation arrangement is closed via the chopping blade. At least one portion of the magnetic flux generated by the magnetic excitation arrangement is longitudinally guided in the chopping blade at least across one longitudinal portion of the chopping blade.

15 Claims, 4 Drawing Sheets

(51) Int. Cl.
*A01F 15/08* (2006.01)
*G01B 7/14* (2006.01)
*G01B 7/293* (2006.01)

(58) Field of Classification Search
CPC .... A01F 7/14; B26D 7/08; B26D 7/26; G01B 7/293; G01B 7/14
USPC ...... 56/10.2 A–10.2 G, 16.4 R, 247; 241/30, 241/37, 242, 243, 287; 340/684, 686.6
See application file for complete search history.

(56) References Cited

U.S. PATENT DOCUMENTS

| | | | |
|---|---|---|---|
| 6,255,812 B1 | 7/2001 | Voigt et al. | |
| 6,886,314 B2 * | 5/2005 | Pirro | A01D 43/08 56/10.2 R |
| 8,141,805 B1 * | 3/2012 | Isaac | A01F 12/40 241/242 |

* cited by examiner

DETECTION ARRANGEMENT FOR DETECTING A STATE OF WEAR OF A CHOPPING ASSEMBLY

CROSS-REFERENCE TO RELATED APPLICATIONS

This application claims priority under 35 USC 119 of German Application No. DE 10 2017 103 537.0, filed on Feb. 21, 2017, the disclosure of which is herein incorporate by reference.

BACKGROUND OF THE INVENTION

The present invention relates to a detection arrangement for detecting a state of wear of a chopping assembly of a forage harvester intended for processing a crop stream to a chopping assembly, and to a forage harvester.

The forage harvester under discussion is equipped with a chopping assembly which comprises a cutting cylinder including elongate chopping blades situated thereon, and comprises a stationary shear bar. The crop fed to the cutting cylinder is chopped, i.e., shredded, by way of the interaction between the chopping blades and the shear bar.

During the chopping operation, the chopping assembly undergoes wear which results from wear of the chopping blades. Specifically, a wear-induced removal of material occurs in the region of the cutting edges of the chopping blades, which results in a reduction in cutting quality and crop throughput.

The wear in the region of the cutting edges of the chopping blades results, on the one hand, in a change in the cutting-edge geometry and, on the other hand, in an enlargement of the engagement gap between the cutting edge and the shear bar. The cutting edge geometry can be restored only by sharpening the chopping blades, while the engagement gap between the cutting edge and the shear bar can be regularly adjusted by advancing the shear bar. In present-day forage harvesters, the two measures can take place automatically and without a visit to a repair facility, although the two measures must be initiated at the correct point in time. In this regard, the exact detection of the state of wear of the chopping assembly takes on particular significance.

The known detection arrangement for detecting a state of wear of a chopping assembly (DE 10 2014 218 408 A1), from which the invention proceeds, is based on the basic consideration that the engagement gap between the chopping blades and the shear bar can form a gap of a magnetic circuit, and therefore the state of wear of the particular chopping blade can be deduced from the change in the magnetic flux. For this purpose, the detection arrangement is equipped with a magnet arrangement which comprises a magnetic excitation arrangement in the form of a permanent magnet, and comprises a flux-conducting device for conducting a resultant magnetic flux.

When a chopping blade moves past the magnet arrangement, the magnet arrangement generates a magnetic flux which passes through the particular chopping blade transversely to the longitudinal extension thereof. The resultant magnetic flux depends, inter alia, on the state of wear of the particular chopping blade, and therefore, the state of wear can be deduced therefrom, in principle.

The known detection arrangement is disadvantageous in that the detection of the state of wear relates only to a single measurement point along the longitudinal extension of the particular chopping blade. This can result in a miscalculation of the state of wear, for example when a singular flaw of the chopping blade is present precisely at this measurement point, but the rest of the chopping blade is free from wear. In order to avoid such a miscalculation, several of the chopping blades moving past the magnet arrangement would have to be situated along the known detection arrangement. This would be disadvantageous in terms of cost.

SUMMARY OF THE INVENTION

The problem addressed by the invention is that of designing and refining the known detection arrangement in such a way that the detection of the state of wear of the chopping assembly is improved with the aid of simple measures.

The aforementioned problem is solved according to the invention by a detection arrangement for detecting a state of wear of a chopping assembly of a forage harvester intended for processing a crop stream, wherein the chopping assembly comprises a cutting cylinder including elongate chopping blades situated thereon, and comprises at least one shear bar which interacts with the chopping blades. The detection arrangement comprises at least one magnet arrangement which includes a magnetic excitation arrangement and a flux-conducting device magnetically coupled thereto.

In the solution according to the present invention, it is initially assumed that the magnet arrangement comprises a pole arrangement which forms at least one magnetic pole having a pole surface for the outward-conduction of magnetic flux. At least one portion of the chopping blades cyclically moves past the pole arrangement during a rotation of the cutting cylinder. As this takes place, the particular chopping blade moving past the pole arrangement forms an air gap arrangement comprising at least one air gap with respect to the pole arrangement, whereby at least one magnetic circuit excited by the excitation arrangement is closed via the particular chopping blade. The magnetic flux resulting in this magnetic circuit depends on the state of wear of the particular chopping blade.

The detection arrangement is therefore equipped with a measuring arrangement and an evaluation unit, wherein the measuring arrangement detects at least one magnetic measured variable related to the magnetic flux in the particular magnetic circuit, and wherein the evaluation unit determines the state of wear of the particular chopping blade on the basis of the at least one detected measured variable. The state of wear results from the wear-induced removal of material from the cutting edge of the chopping blade and the associated change in the width of the engagement gap between the cutting edge of the chopping blade and the shear bar. Therefore, the width of at least one air gap of the air gap arrangement and the aforementioned magnetic flux are also affected by the state of wear. In the end, a value for the state of wear can also be determined from the aforementioned measured variable.

Essential to the solution according to the invention is the basic consideration that at least one portion of the magnetic flux generated by the magnetic excitation arrangement is longitudinally guided in the chopping blade across at least one longitudinal portion of the chopping blade moving past the pole arrangement. In contrast to that which is known from the related art, the magnetic flux is therefore no longer guided transversely, but rather longitudinally in the particular chopping blade.

The detection of the state of wear therefore relates to the entire aforementioned longitudinal portion of the chopping blade and the gap of the gap arrangement adjoining this longitudinal portion, and therefore an aforementioned singular flaw has less of an impact in the detection of the state of wear.

Since a penetration of the chopping blade in the transverse direction is no longer required, the pole arrangement can be readily optimized in such a way that the resultant magnetic flux is longitudinally guided across the cutting edge of the particular chopping blade to the greatest possible extent.

In one embodiment, the pole arrangement forms at least two magnetic poles which are mutually spaced along the chopping blade moving past the pole arrangement, each magnetic forming one air gap of the air gap arrangement together with the chopping blade and the magnetic flux generated by the magnetic excitation arrangement being longitudinally guided in the chopping blade between the magnetic poles. Therefore, the state of wear of the chopping blade can be determined in the longitudinal portion between the two poles.

In another embodiment, the state of wear can be determined in different longitudinal portions of the particular chopping blade, wherein the different longitudinal portions are each situated between different poles of the pole arrangement.

In yet another embodiment, the pole arrangement forms at least three magnetic poles, which are mutually spaced along the chopping blade moving past the pole arrangement, each magnetic pole forming one air gap of the air gap arrangement together with the chopping blade moving past the pole arrangement.

Preferably, at least one of the poles is a component of two magnetic circuits excited by the magnetic excitation arrangement.

In a further embodiment, the pole arrangement forms at least five magnetic poles which are mutually spaced along the chopping blade moving past the pole arrangement, each magnetic pole forming one air gap of the air gap arrangement together with the chopping blade moving past the pole arrangement. Preferably, at least one of the poles, in particular at least three of the poles, is/are a component of at least two magnetic circuits excited by the magnetic excitation arrangement.

Essential to all embodiments of the invention is the fact that the magnetic flux, which is longitudinally guided in the particular chopping blade, extends between two such poles of the pole arrangement.

In the further preferred embodiment, the poles of the pole arrangement are situated along the cutting edge of the chopping blade moving past the pole arrangement or along the shear bar, and therefore the magnetic flux under discussion can be guided along the particular chopping blade in a low-loss manner.

A particularly preferred embodiment has the design of the magnet arrangement comprising one central portion of the flux-conducting device makes it possible to implement different detection regions using one and the same detection arrangement.

In a preferred embodiment, the magnet arrangement, in particular together with the measuring arrangement, is designed as an assembly which is separate from the shear bar, and therefore the mechanical robustness of the shear bar is not adversely affected by the magnet arrangement. Simultaneously, it is preferably provided that the magnet arrangement is coupled to the shear bar, and therefore a possible advancement of the shear bar is conveyed to the magnet arrangement.

The measuring unit can be equipped with a coil arrangement, which is a particularly simple variant of the detection of a change in the magnetic flux via the particular induced voltage.

In another embodiment, the evaluation unit determines the state of wear of the particular chopping blade on the basis of an absolute value, in particular a peak value, of the at least one measured variable and/or on the basis of a progression of the at least one measured variable, during a rotation of the cutting cylinder in each case. It becomes clear in this case that the solution according to the invention can be varied in highly diverse ways using one and the same magnet arrangement. This preferably takes place exclusively by way of software.

According to yet another teaching, the detection arrangement is used in a chopping assembly of a forage harvester provided for processing a crop stream. The chopping assembly according to the invention comprises a cutting cylinder including elongate chopping blades situated thereon, and at least one shear bar which interacts with the chopping blades in the above-described way. Essential is the fact that the chopping assembly according to the invention is equipped with an above-described detection arrangement according to the invention for detecting a state of wear of the chopping assembly. Reference is therefore made to all the comments made with respect to the detection arrangement according to the invention.

According to yet another teaching the detection arrangement is used in a forage harvester for processing a crop stream. The forage harvester according to the invention comprises a compression unit which is equipped with at least two compression rollers, which form a bale chamber, and comprises a discharge chute. Essential according to this further teaching is the fact that an above-described chopping assembly according to the invention is provided with a detection arrangement for detecting a state of wear. Reference is also made, in this regard, to all the comments made with respect to the chopping assembly according to the invention, and to the detection arrangement according to the invention.

BRIEF DESCRIPTION OF THE DRAWINGS

The invention is explained in the following in greater detail with reference to a drawing representing only one exemplary embodiment. In the drawing.

DETAILED DESCRIPTION OF THE EMBODIMENTS

Figure 1:
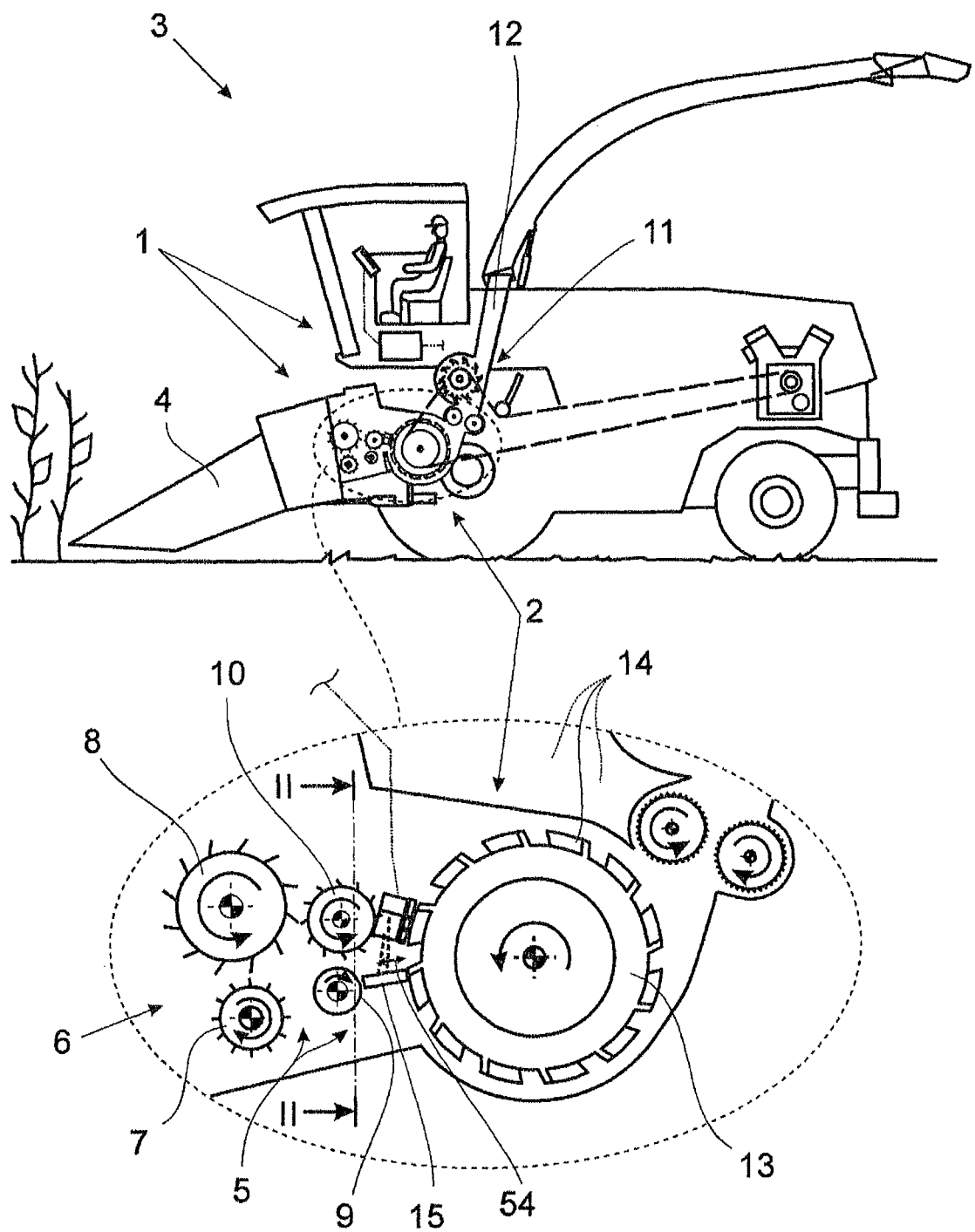
FIG. 1 shows a highly schematic representation of a forage harvester according to the invention, comprising a chopping assembly according to the invention, and comprising a detection arrangement according to the invention.

The detection arrangement 1 represented in the drawing is used for detecting a state of wear of a chopping assembly 2 which is assigned to a forage harvester 3 intended for processing a crop stream. The forage harvester 3 is equipped with a front harvesting attachment 4 in this case. The forage harvester 3 further comprises a compression unit 5 which functions as a feed device for the crop stream. The compression unit 5 is equipped with at least two—four in all, in this case—compression rollers 7-10 forming a bale chamber 6. In this case, the front compression rollers 7, 8 carry out a preliminary compression of the picked-up crop, while the rear compression rollers 9, 10 carry out a uniform compression and a further conveyance of the crop.

The chopping of the picked-up crop is carried out in the chopping assembly 2 which is abutted by a further conveyor device 11 for conveying the chopped crop into a discharge chute 12. The chopping assembly 2 comprises a cutting cylinder 13 including elongate cutting blades 14 situated thereon, and at least one—exactly one in this case and preferably—shear bar 15 which interacts with the chopping blades 14 for the chopping process.

Figure 2:
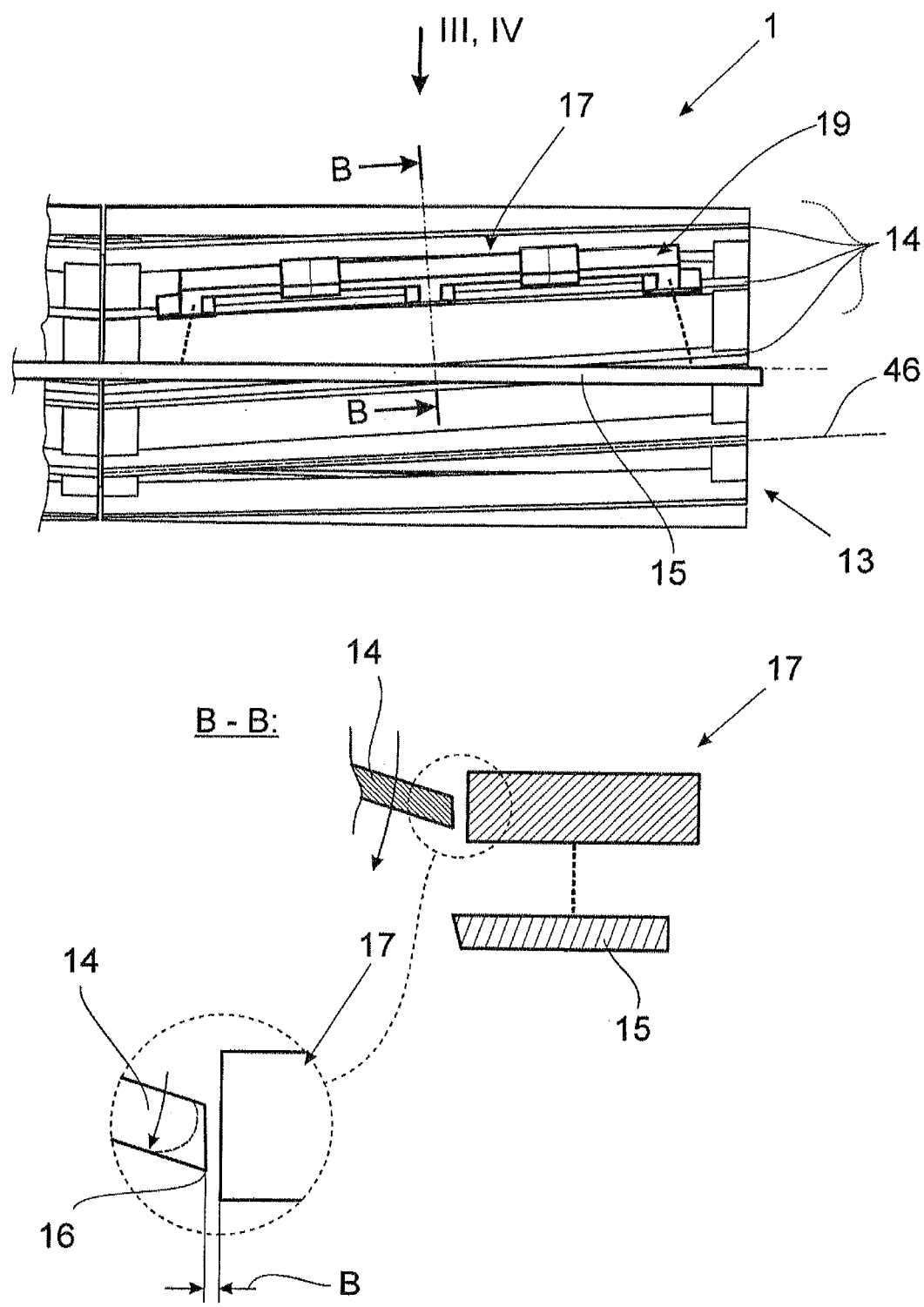
FIG. 2 shows the detection arrangement of the forage harvester according to FIG. 1, in the view II-II.

FIG. 2 shows, in the sectional view B-B, the basic design of the chopping blade 14 and the shear bar 15. The chopping blade 14 comprises a cutting edge 16, the state of wear of which is decisive for the cutting quality that can be achieved. A possible, wear-induced removal of material from the cutting edge 16 is indicated using a dashed line in this representation according to FIG. 2. It is clear from the detailed representation shown on the left in FIG. 3 that the wear-induced removal of material is non-uniform across the longitudinal extension of the particular chopping blade 14.

The detection arrangement 1 comprises at least one—exactly one in this case and preferably—magnet arrangement 17 which includes a magnetic excitation arrangement 18 and a flux-conducting device 19 which is magnetically coupled to the excitation arrangement 18. Only one magnet arrangement 17 is ever discussed in the following. All the comments made with respect to the one magnet arrangement 17 apply similarly for all further magnet arrangements 17 which may be provided.

Figure 3:
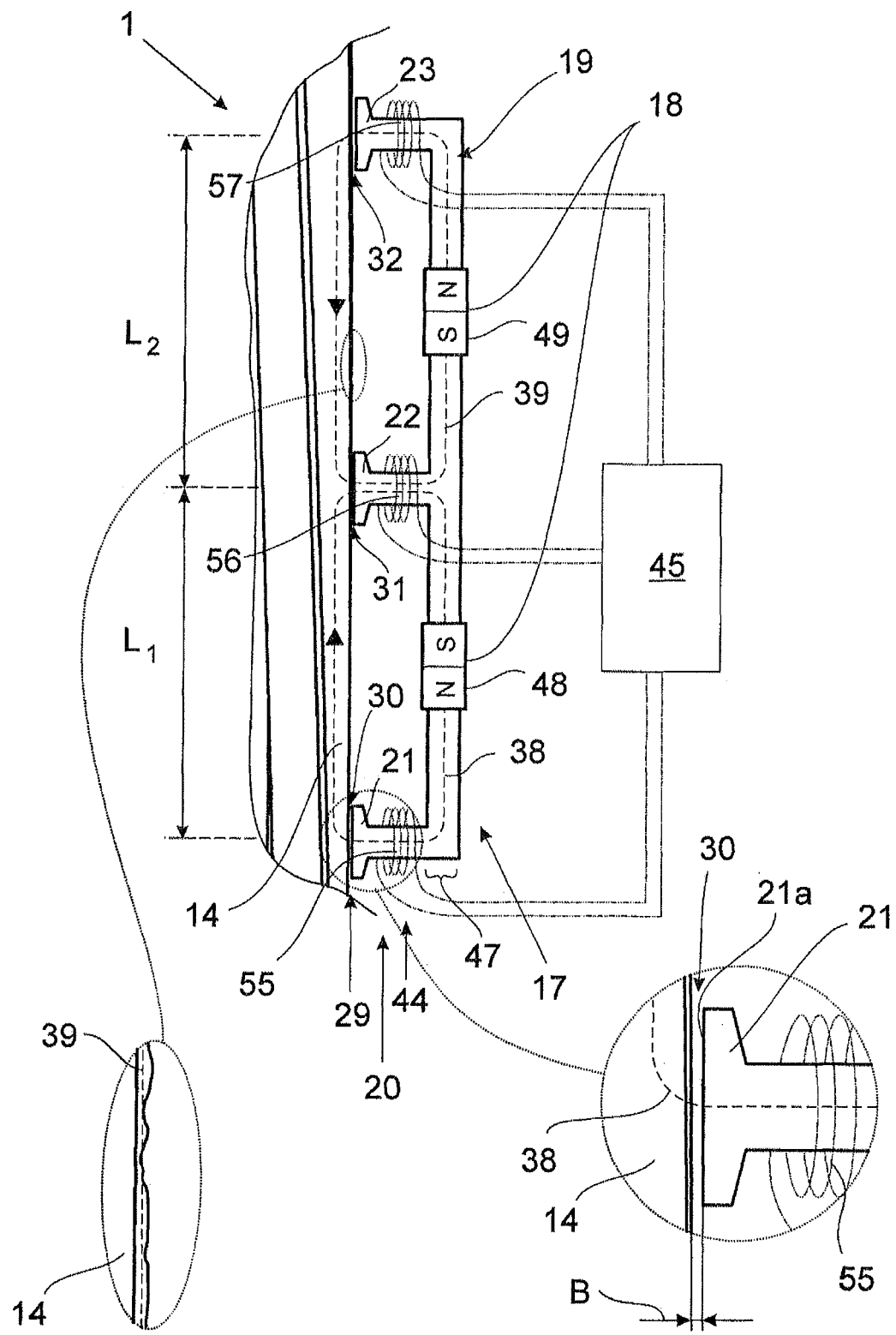
FIG. 3 shows the detection arrangement according to FIG. 2, in the view III.

The basic design of the magnet arrangement 17 is shown in the representation according to FIG. 3. In this case it becomes clear that the magnet arrangement 17 provides a pole arrangement 20 which is fixed with respect to the cutting cylinder 13 and forms at least one magnetic pole 21-28 including a pole surface for the outward conduction of the magnetic flux. Such a pole surface for the pole 21, by way of example, has been provided with the reference sign 21a in FIG. 3.

The cutting cylinder 13 of the forage harvester 3 shown in FIG. 1 is-axially divided into two pieces and, as viewed in the direction of travel, comprises a left cylinder half and a right cylinder half. FIG. 2 shows the left cylinder half. The right cylinder half is similarly designed and equipped with a detection arrangement 1 according to the invention.

At least one portion of the chopping blades 14, specifically the chopping blades 14 of the left cylinder half in this case, moves past the pole arrangement 20 during a rotation of the cutting cylinder 13. In this case, the particular chopping blade 14 moving past the pole arrangement 20 temporarily forms an air gap arrangement 29 comprising at least one air gap 30-37 with respect to the pole arrangement 20. FIG. 3 further shows that, as a result, at least one magnetic circuit 38-43 excited by the excitation arrangement 18 is closed via the particular chopping blade 14. In light of the fact that the resultant magnetic flux in the particular magnetic circuit 38-43 depends on the geometry and the width B of the particular air gap 30-37, given a predefined magnetic excitation, it becomes clear from a glance at the representation according to FIG. 2 that the state of wear of the particular chopping blade 14 can be determined based on the resultant magnetic flux.

In the simplest case, the change in the magnetic flux, optionally the change in the first derivative of the magnetic flux in the time range, as discussed further below, represents the state of wear with respect to the situation in which a chopping blade 14 is free from wear. The value for this change therefore represents the state of wear. It is also conceivable, however, that a value is calculated, on the basis of the at least one determined magnetic measured variable, for the wear-induced width of at least one air gap 30-37 of the air gap arrangement 29 or for the wear-induced geometry of the cutting edge 16 of the particular chopping blade 14.

The detection arrangement 1 according to the invention therefore comprises a measuring arrangement 44 and an evaluation unit 45, wherein the measuring arrangement 44 detects, in general with respect to at least one magnetic measured variable, the magnetic flux in at least one magnetic circuit 38-43 excited by the excitation arrangement 18, and wherein the evaluation unit 45, likewise in general, determines the state of wear of the particular chopping blade 14 on the basis of the at least one detected measured variable. The way in which this specifically takes place is explained further below.

It is essential here that at least one portion of the magnetic flux generated by the magnetic excitation arrangement 18 is longitudinally guided in the chopping blade 14 at least across one longitudinal portion $L_1$-$L_6$ of the chopping blade 14 moving past the pole arrangement 20, preferably across the entire length of the chopping blade 14 moving past the pole arrangement 20. The basic course of the magnetic flux is shown, in the drawing, in the representation of the particular associated magnetic circuit 38-43.

The term "longitudinal" used in conjunction with the chopping blades 14 always refers to the elongate design of the chopping blades 15. In this regard, the term "longitudinal" refers to the longitudinal extension of the chopping blades 14, which has been provided with the reference sign 46 in FIG. 2, by way of example.

The longitudinal guidance, according to the present invention, of the magnetic flux generated by the magnetic excitation arrangement 18 is preferably provided across at least-one-eighth, further preferably across at least one-fourth, and further preferably across at least one-half of the longitudinal extension of the chopping blades 14.

In one particularly preferred embodiment, the pole arrangement 20 comprises at least two magnetic poles 21-28 which are mutually spaced along the chopping blade 14 moving past the pole arrangement 20, each magnetic pole forming one air gap 30-37 of the air gap arrangement 29 together with the chopping blade 14 and the magnetic flux generated by the magnetic excitation arrangement 18 being longitudinally guided in the chopping blade 14 between the magnetic poles. As a result, the state of wear of the chopping blade 14 can be likewise determined in the longitudinal portion $L_1$-$L_6$ between the two poles 21-28. This is shown in FIG. 3 for a total of three poles 21-23 and in FIG. 4 for a total of five poles 24-28.

At least two poles of the pole arrangement 20 are preferably mutually spaced by at least one-sixteenth, further preferably by at least one-eighth, further preferably by at least one-fourth, and further preferably by at least one-half of the longitudinal extension of the particular chopping blade 14.

The region in which the state of wear is to be detected can be determined on the basis of the position of the poles 21-23 along the particular chopping blade 14 which is moving past. It is also conceivable to design the magnet arrangement 17, overall, in such a way that the state of wear can be detected separately for different longitudinal portions $L_1$-$L_6$ of the relevant chopping blade 14. This can be easily implemented, for example, by way of the flux-conducting device 19 comprising two or more portions which are designed separately from each other.

The separate detection of the state of wear for different longitudinal portions $L_1$-$L_6$ of the particular chopping blade 14 is meaningful, in particular, when the wear of the chopping blades 14 changes across the longitudinal extension of the chopping blades 14. It is usually the case, namely, that the wear on the outer sides of the cutting cylinder 13 is greater than in the center of the cutting cylinder 13, and therefore the cutting cylinder 13 takes on a crowned shape.

Figure 4:
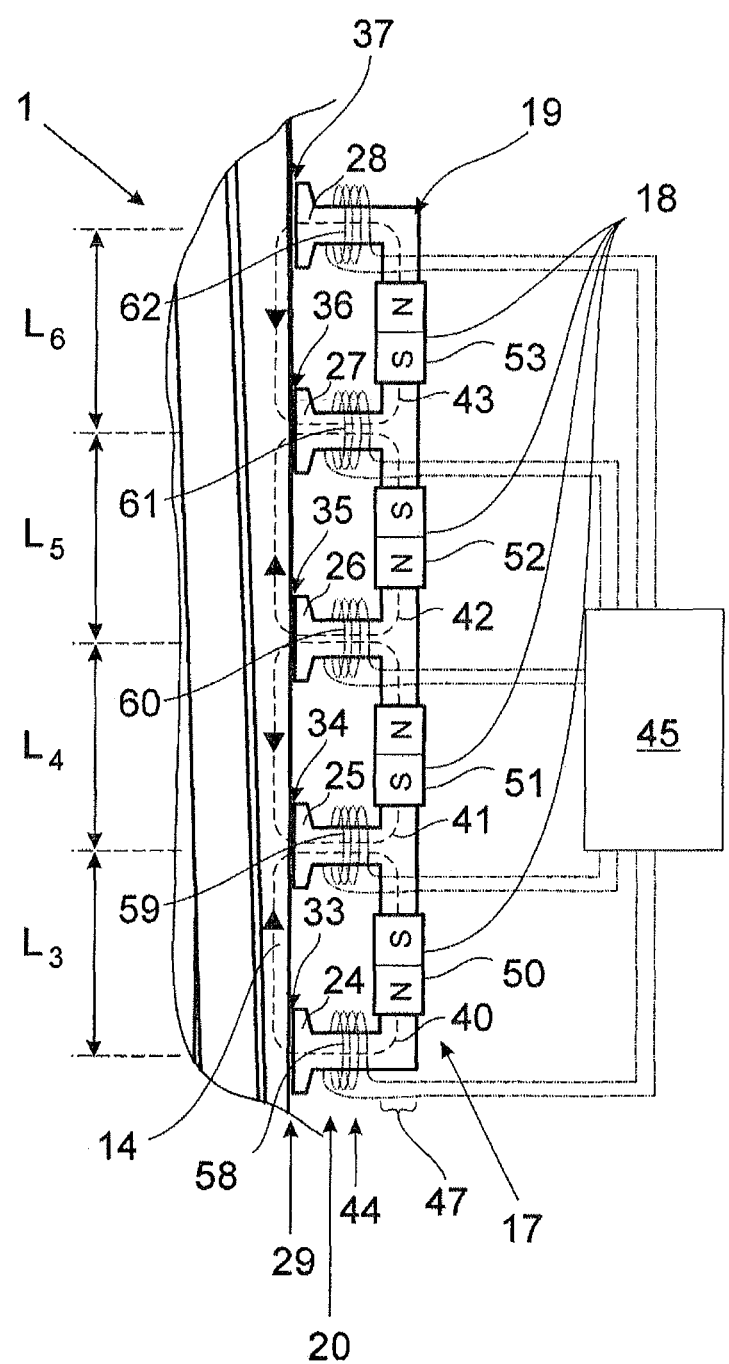
FIG. 4 shows one alternative embodiment of the detection arrangement according to FIG. 3.

FIGS. 3 and 4 further show that the state of wear can be determined in different longitudinal portions $L_1$-$L_6$ of the particular chopping blade 14, wherein the different longitudinal portions $L_1$-$L_6$ are each situated between different poles 21-28, in this case and preferably between adjacent poles 21-28 of the pole arrangement 20.

As a precondition for the above-described detection of the state of wear in different longitudinal portions $L_1$-$L_6$, the pole arrangement 20 must form at least three magnetic poles 21-28 which are mutually spaced along the chopping blade 14 moving past the pole arrangement 20, each magnetic pole forming an air gap 30-37 of the air gap arrangement 29 together with the chopping blade 14 moving past the pole arrangement 20. This is shown in FIG. 3. In this case, it is preferred that at least one of the poles 21-28—in this case and preferably the pole 22—is a component of two of the magnetic circuits 38, 39 excited by the magnetic excitation arrangement 18. The determination of the magnetic flux flowing through the two magnetic circuits 38, 39 therefore provides an indication, as described above, of the state of wear of the particular chopping blade 14 in the longitudinal portions $L_1$ and $L_2$.

The determination of the state of wear of the particular chopping blade 14 in further longitudinal portions $L_1$-$L_6$ is made possible by the further preferred embodiment according to FIG. 4, in which the pole arrangement 20 forms at least five—exactly five in this case and preferably—magnetic poles 21-28 which are mutually spaced along the chopping blade 14 moving past the pole arrangement 20, each magnetic pole forming, as described above, one air gap 30-37 of the air gap arrangement 29 together with the chopping blade 14 moving past the pole arrangement 20. In this case, it is further preferred that at least one of the poles 21-28—in this case and preferably the three poles 25, 26, 27—is/are a component of at least two of the magnetic circuits excited by the magnetic excitation arrangement 18, namely the magnetic circuits 40-43 in this case.

A particularly low-loss design of the magnetic circuits 38-43 results by way of the fact that at least one portion of the poles 21-28—in this case and preferably all the poles 21-28—of the pole arrangement 20 is/are situated along the cutting edge 16 of the chopping blade 14, which is moving past the pole arrangement 20, or along the shear bar 17. The alternative mentioned at the outset is best shown in the representations according to FIGS. 3 and 4. Alternatively or additionally, it is provided that at least one portion of the poles 21-28 of the pole arrangement 20 is passed simultaneously by the chopping blades 14. By way of this orientation of the poles 21-28, an optimal conduction of the magnetic flux into and out of the chopping blade 14 can be achieved, in which case the magnetic flux is preferably guided in the cutting edge 16 of the chopping blade 14.

A structurally easily implementable embodiment of the flux-conducting device 19 is shown by FIGS. 3 and 4. In this case, it is provided that the flux-conducting device 19 includes a central portion 47, from which the poles 21-28 of the pole arrangement 20 branch off. The central portion 47 of the flux-conducting device 19 is designed to be straight in this case and preferably. Alternatively or additionally, it can be provided that the central portion 47 of the flux-conducting device 19, as shown in FIGS. 3 and 4, extends along the cutting edge 16 of the chopping blade 14 moving past the pole arrangement 20. A symmetrical structure, overall, of the flux-conducting device 19 results, which further facilitates the determination of the state of wear of the particular chopping blade 14. Alternatively, it can also be provided that the central portion 47 of the flux-conducting device 19 extends along the shear bar 17.

Different advantageous variants of the embodiment of the excitation arrangement 18 are conceivable. In this case and preferably, the excitation arrangement 18 comprises at least one excitation magnet 48-53 which is designed as a permanent magnet. Alternatively, the excitation magnet 48-53 can also be an electromagnet. In the exemplary embodiments represented in FIGS. 3 and 4, the excitation magnets 48-53 are situated in one portion of the flux-conducting device 19, namely in the central portion 47 of the flux-conducting device 19 in this case. In principle, the excitation magnets 48-53 can also be integrated into the poles 21-28 of the pole arrangement 20.

In the represented and, in this regard, preferred exemplary embodiments, on excitation magnet 48-53 is assigned to each magnetic circuit 38-43. In principle, it can also be provided, however, that one excitation magnet 48-53 provides for the magnetic excitation of two or more magnet circuits 38-43.

As shown in a combination of FIGS. 1 and 2, the magnet arrangement 17 is designed—in this case and preferably together with the measuring arrangement 44—as an assembly which is separate from the shear bar 15. This is advantageous, since the magnet arrangement 17—together with the measuring arrangement 44 in this case—and the shear bar 15 on the other hand can be designed to be separate from each other, and mutual harm to mechanical and/or measurement-related properties does not take place.

In order to ensure that the measuring arrangement follows an advancement 54 of the shear bar 15, the magnet arrangement 17, preferably together with the measuring arrangement 44, is mechanically coupled to the shear bar 15 in this case and preferably. In one particularly preferred embodiment, this mechanical coupling is a mechanical connection, which can be particularly easily implemented. This mechanical connection is merely indicated in the drawing with the aid of dashed lines.

In the represented and, in this regard, preferred exemplary embodiment, the magnet arrangement 17, together with the measuring arrangement 44 in this case, is situated above the shear bar 15. In principle, it can also be conversely provided that the magnet arrangement 17, together with the measuring arrangement 44 in this case, is situated below the shear bar 15.

The measuring arrangement 44 comprises, here and preferably, at least one measuring unit 55-62 for detecting the at least one magnetic flux-based measured variable. In this case, it is preferably provided that one measuring unit 55-62 is assigned to each of at least two of the magnetic circuits 38-43 excited by the magnetic excitation arrangement 18. In the exemplary embodiments which are represented in FIGS. 3 and 4 and, in this regard, are preferred, one measuring unit 55-62 is assigned to each of all the magnetic circuits 38-43.

FIGS. 3 and 4 show a particularly simple embodiment of the measuring units 55-62. One measuring unit 55-62 in each case comprises a coil arrangement, through which the magnetic flux in the flux-conducting device 19 flows. By way of the rotation of the cutting cylinder 13, the above-described air gap arrangement 29 is cyclically excited and eliminated again, and therefore a correspondingly cyclical change in the magnetic flux results in the time range in at least one of the magnetic circuits 38-43. In this case, the measuring unit 55-62 preferably detects, as the measured variable, the voltage induced in the coil arrangement. In this regard, the measured variable corresponds to the first derivative of the particular magnetic flux in the time range, on the basis of which a value can be determined for the state of wear of the particular chopping blade 14, optionally with reference to the wear-free state.

Numerous other variants for the embodiment of the measuring unit 55-62 are conceivable. For example, the measuring unit 55-62 can be designed as a magnetic field sensor, wherein the measuring unit 55-62 then detects, as the measured variable, a value for the magnetic flux density in a magnetic circuit 38-43 excited by the magnetic excitation arrangement 18. Such a measuring unit 55-62 can be designed, for example, as a Hall sensor, an MR sensor, a GMR sensor, or the like.

It was explained further above that the measured variable determined by the measuring arrangement 44 changes depending on the state of wear. This means that the state of wear can be derived from the determined measured variable. The measured variable is acquired by the evaluation unit 45 which comprises, for this purpose and in a usual way, at least one microprocessor and one memory unit. Different advantageous variants are conceivable for the determination of the state of wear. In the simplest case, a learning process can be provided, in which the particular measured variable is detected and stored for different states of wear. A characteristic map can be formed from these values, which is used as the basis for the subsequent determination of the state of wear, i.e., a value which represents the state of wear.

In general, it is provided that the evaluation unit 45 determines the state of wear of the particular chopping blade 14 on the basis of an absolute value, in particular a peak value, of the at least one measured variable and/or on the basis of a progression of the at least one measured variable, during a rotation of the cutting cylinder 13 in each case. Due to the rotation of the cutting cylinder 13 and, therefore, the movement of the chopping blades 14, a continuous change in the magnetic fluxes results in the particular magnetic circuits 38-43, the change being dependent on the state of wear and being easily detected via the aforementioned induced voltage.

It is to be pointed out once more that only one single magnet arrangement 17 is ever discussed in the represented exemplary embodiments, the magnetic flux of which is detected by the measuring arrangement 44 and is evaluated by the evaluation unit 45. It can also be provided, however, that two or more magnet arrangements 17 are provided, the magnetic fluxes of which are detected by the measuring arrangement 44 and are evaluated by the evaluation unit 45. For example, it can be advantageous that two magnet arrangements 17 are provided along the particular chopping blade 14 which is moving past, the magnetic fluxes of the magnet arrangements being detected by the measuring arrangement 44 and being evaluated by the evaluation unit 45. Therefore, a detection of the state of wear is possible at two longitudinal portions $L_1$-$L_6$ or at multiple longitudinal portions $L_1$-$L_6$ of the particular chopping blade 14. In principle, it can then also be provided that the evaluation unit 45 comprises individual evaluation subunits, which preferably operate separately from each other and which are assigned to the individual magnet arrangements 17. As a result, it is possible that the magnet arrangements 17, together with the measuring arrangement 44 and the evaluation unit 45, each provide the function of a self-sufficient sensor.

According to yet another teaching, which has independent significance, the chopping assembly 2, which is equipped with a detection arrangement 1 according to the invention, is claimed as such. Reference is made to all the comments made in this regard.

According to yet another teaching, which likewise has independent significance, the forage harvester 3, which is equipped with a chopping assembly 2 according to the invention, is claimed as such. Reference is also made to all the comments made in this regard.

| List of reference signs | |
|---|---|
| 1 | detection arrangement |
| 2 | chopping assembly |
| 3 | forage harvester |
| 4 | front harvesting attachment |
| 5 | compression unit |
| 6 | bale chamber |
| 7-10 | compression rollers |
| 11 | conveyor device |
| 12 | discharge chute |
| 13 | cutting cylinder |
| 14 | chopping blade |
| 15 | shear bar |
| 16 | cutting edge |
| 17 | magnet arrangement |
| 18 | excitation arrangement |
| 19 | flux-conducting device |
| 20 | pole arrangement |
| 21-28 | poles |
| 21a | pole surface |
| 29 | air gap arrangement |
| 30-37 | air gap |
| 38-43 | magnetic circuit |
| 44 | measuring arrangement |
| 45 | evaluation unit |
| 46 | longitudinal extension |
| 47 | central portion of the flux-conducting device |
| 48-53 | excitation magnets |
| 54 | advancement |
| 55-62 | measuring unit |
| B | width |

What is claimed is:

1. A detection arrangement for detecting a state of wear of a chopping assembly of a forage harvester intended for processing a crop stream, wherein the chopping assembly comprises a cutting cylinder including elongate chopping blades situated thereon, and at least one shear bar which interacts with the chopping blades, the detection arrangement comprising:

at least one magnet arrangement which includes a magnetic excitation arrangement and a flux-conducting device magnetically coupled thereto, said magnet arrangement providing a pole arrangement which forms at least one magnetic pole including a pole surface for outwardly conducting magnetic flux, wherein the magnet arrangement is configured so that at least one portion of the chopping blades moves past the pole arrangement during a rotation of the cutting cylinder, a particular one of the chopping blades moving past the pole arrangement forms an air gap arrangement including at least one air gap with respect to the pole arrangement and, as a result, at least one magnetic circuit excited by the excitation arrangement is closed via the particular chopping blade, a measuring arrangement configured to detect, with respect to at least one magnetic measured variable, the magnetic flux in the at least one magnetic circuit excited by the excitation arrangement, and an evaluation unit configured to determine the state of wear of the particular chopping blade on the basis of the at least one detected magnetic measured variable, wherein at least one portion of the magnetic flux generated by the magnetic excitation arrangement is longitudinally guided in the particular chopping blade at least across one longitudinal portion of the particular chopping blade moving past the pole arrangement.

2. The detection arrangement as claimed in claim 1, wherein the pole arrangement forms at least two magnetic poles which are mutually spaced along the particular chopping blade moving past the pole arrangement, each magnetic pole forming one of the air gaps of the air gap arrangement together with the particular chopping blade and the magnetic flux generated by the magnetic excitation arrangement being longitudinally guided in the particular chopping blade between the magnetic poles, wherein the evaluation unit is configured to determine the state of wear of the chopping in the longitudinal portion between the two poles.

3. The detection arrangement as claimed in claim 1, wherein the evaluation unit is configured to determine the state of wear in different longitudinal portions of the particular chopping blade, wherein the different longitudinal portions are each situated between different poles of the pole arrangement.

4. The detection arrangement as claimed in claim 1, wherein the pole arrangement forms at least three magnetic poles which are mutually spaced along the particular chopping blade moving past the pole arrangement, each magnetic pole forming one of the air gaps of the air gap arrangement together with the particular chopping blade moving past the pole arrangement, wherein the at least one magnetic circuit excited by the magnetic excitation arrangement comprises two magnetic circuits, and wherein at least one of the poles is a component of the two magnetic circuits excited by the magnetic excitation arrangement.

5. The detection arrangement as claimed in claim 1, wherein the pole arrangement forms at least five magnetic poles which are mutually spaced along the particular chopping blade moving past the pole arrangement, each one of the magnetic poles forming one of the air gaps of the air gap arrangement together with the particular chopping blade moving past the pole arrangement, wherein the at least one magnetic circuit excited by the magnetic excitation arrangement comprises two magnetic circuits, and wherein at least one of the poles is a component of the at least two magnetic circuits excited by the magnetic excitation arrangement.

6. The detection arrangement as claimed in claim 1, wherein at least one of the poles of the pole arrangement is situated along the cutting edge of the particular chopping blade moving past the pole arrangement or along the shear bar, or at least one portion of the poles of the pole arrangement is passed simultaneously by the chopping blades.

7. The detection arrangement as claimed in claim 1, wherein the flux-conducting device comprises a central portion, from which the poles of the pole arrangement branch off, wherein the central portion of the flux-conducting device is designed to be straight or extends along the cutting edge of the particular chopping blade moving past the pole arrangement, or extends along the shear bar.

8. The detection arrangement as claimed in claim 1, wherein the magnet arrangement together with the measuring arrangement is designed as an assembly which is separate from the shear bar.

9. The detection arrangement as claimed in claim 1, wherein the magnet arrangement together with the measuring arrangement is mechanically coupled and mechanically connected to the shear bar and wherein the magnet arrangement together with the measuring arrangement is situated above the shear bar or under the shear bar.

10. The detection arrangement as claimed in claim 1, wherein the at least one magnetic circuit excited by the magnetic excitation arrangement comprises at least two magnetic circuits, and wherein the measuring arrangement comprises at least one measuring unit for detecting the at least one magnetic flux-based measured variable, such that one measuring unit of the at least one measuring unit is assigned to each of the at least two magnetic circuits excited by the magnetic excitation arrangement.

11. The detection arrangement as claimed in claim 10, wherein the at least one measuring unit comprises a coil arrangement, through which the magnetic flux in the flux-conducting device flows, and wherein the at least one measuring unit detects, as the measured variable, voltage induced in the coil arrangement.

12. The detection arrangement as claimed in claim 10, wherein the at least one measuring unit is designed as a magnetic field sensor and wherein the at least one measuring unit detects, as the measured variable, a value for the magnetic flux density in one of the magnetic circuits excited by the magnetic excitation arrangement.

13. The detection arrangement as claimed in claim 1, wherein the evaluation unit is configured to determine the state of wear of the particular chopping blade on the basis of a peak value of the at least one measured variable or on the basis of a progression of the at least one measured variable, during a rotation of the cutting cylinder.

14. A chopping assembly of a forage harvester intended for processing a crop stream, comprising:
a cutting cylinder including elongate chopping blades situated thereon,
at least one shear bar which interacts with the chopping blades, and
a detection arrangement according to claim 1 for detecting a state of wear of the chopping assembly.

15. A forage harvester for processing a crop stream, comprising:
a compression unit which includes at least two compression rollers forming a bale chamber, and
a chopping assembly as claimed in claim 14.

* * * * *